United States Patent

[11] 3,569,839

[72] Inventor Robert K. Dyer
Rte. 1, Box 219A, Allen, Tex. 75002
[21] Appl. No. 691,635
[22] Filed Dec. 18, 1967
[45] Patented Mar. 9, 1971

[54] PROGRAM SELECTOR
7 Claims, 3 Drawing Figs.

[52] U.S. Cl. 325/396, 178/6, 325/464
[51] Int. Cl. H04b 1/06
[50] Field of Search 325/464, 465, 395, 396; 178/5.8, 6 (Tuning); 334/47, 88

[56] References Cited
UNITED STATES PATENTS

| | | | |
|---|---|---|---|
| 2,367,363 | 1/1945 | Matt | 325/395 |
| 2,755,424 | 7/1956 | Papitto | 178/60X |
| 2,803,075 | 8/1957 | Pearne | 178/60X |
| 2,852,670 | 9/1958 | Jacques et al. | 325/396 |
| 2,944,245 | 7/1960 | Lynnworth et al. | 325/395X |
| 3,054,038 | 9/1962 | Rast et al. | 325/396X |

*Primary Examiner*—Robert L. Griffin
*Assistant Examiner*—R. S. Bell
*Attorney*—Dunlap, Laney, Hessin & Dougherty

ABSTRACT: Disclosed are apparatus and methods for limiting reception and conversion of television broadcast signals. The apparatus includes clock-driven screening means which selectively interrupt current flowing through control lines, and switches for selectively interconnecting a control device in parallel with the control lines.

INVENTOR
ROBERT K. DYER
Jack A Kanz
ATTORNEY

PROGRAM SELECTOR

This invention relates to apparatus and methods for selectively controlling and screening reception of regularly programmed television broadcasts. More particularly it relates to a system which allows preselection of desired programs and, when installed in a conventional television receiver, prevents the reception of programs which are considered undesirable.

The wide variety of television programming available, particularly in large metropolitan areas wherein several different channels are broadcast simultaneously, results in the broadcasting of some programs which parents may feel unsuitable for viewing by their children while suitable programs are being aired on competing channels at the same time. It is often quite inconvenient to continuously monitor the programs being viewed by the children, particularly in situations where the children have access to a television receiver in a play room or private area remote from their parents. Accordingly, it is desirable to have means whereby television receivers capable of receiving a broad range of broadcast television signals and converting said signals to visual representation may be rendered inoperative when tuned to particular channels during preselected broadcasting time periods. It is therefore an object of this invention to provide an apparatus which may be incorporated into a conventional television receiver which will render the receiver inoperative when tuned to preselected channels at preselected time periods, but remain fully operative as to other channels during the same periods. Another object is to provide a child-proof preselection program whereby undesirable television programs can be selectively screened from reception, but the viewer be left free to select any of several other channels available at the same time.

A particular advantage of the present invention is the provision of a means whereby preselected channels can be screened from reception without impairing the reception of other channels. Furthermore, the television receiver is not automatically switched to any preselected program, but simply prevented from receiving undesirable programs, leaving the viewer free to select other programs.

Figure 1:
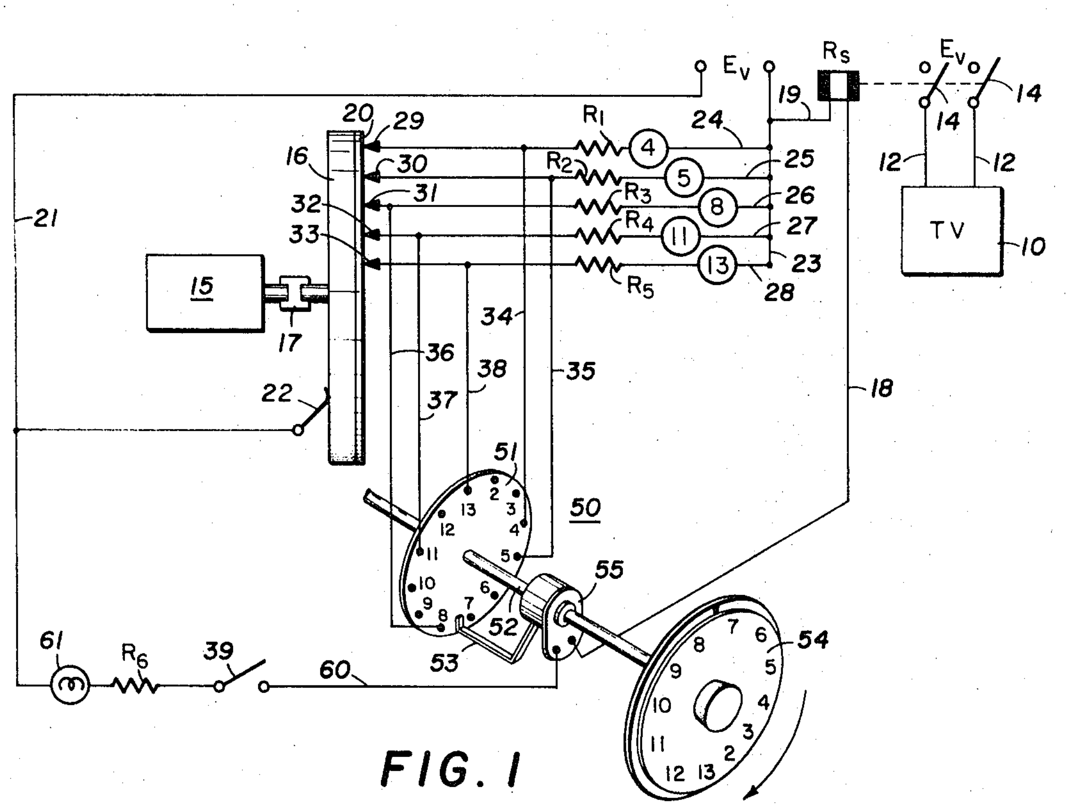
Figure 2:
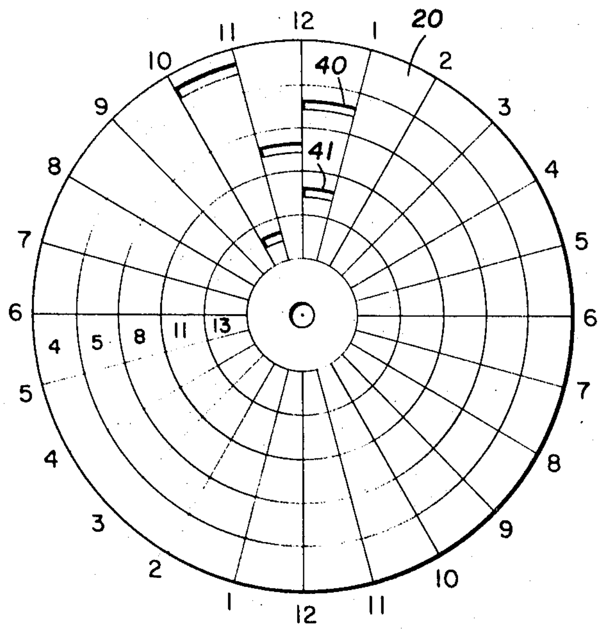
Figure 3:
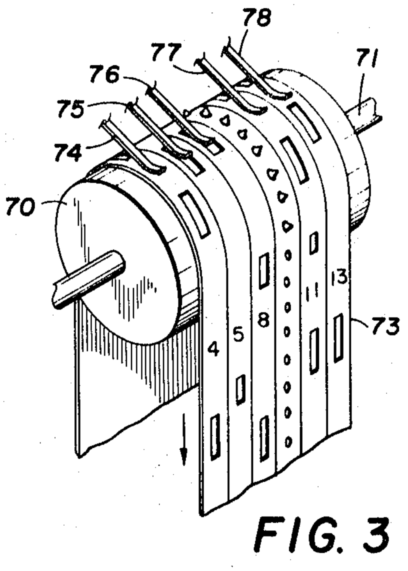

Other objects, features and advantages will become more readily understood from the following detailed description taken in connection with the appended claims and attached drawings in which FIG. 1 schematically illustrates the operating principles of the invention; FIG. 2 is a plan view of the screening disc used in one embodiment of the invention; and FIG. 3 is a perspective view of a selection drum and screening tape used in another embodiment of the invention.

Briefly, in accordance with the invention, a mechanism is provided which interrupts the conversion of television signals in a conventional television receiver when such receiver is tuned to specified channels at times which have been selectively screened by the operator. Operation of the mechanism will be understood with reference to FIG. 1 wherein a conventional television reception unit 10 is schematically illustrated which draws power from a power source $E_v$ through conductive leads 12. The supply of power to TV 10 through leads 12 from power source $E_v$ is controlled by a relay $R_s$ which is normally open as indicated by schematic switches 14.

When normally open relay $R_s$ is energized, switches 14 are closed and television set 10 receives power from source $E_v$ in the conventional manner and operates as a conventional television reception unit. In accordance with the invention, relay $R_s$ is operated to selectively interrupt the power flowing to receiver 10 in accordance with program selections of the operator.

It will be readily appreciated that although relay $R_s$ is illustrated herein as controlling power to the television receiver, relay $R_s$ may alternately control other critical points within the receiver to prevent the conversion of television signals when the control device is activated.

In accordance with the preferred embodiments of the invention, there is provided a clock-drive motor 15 which drives a rotating conductive disc 16. The conductive disc 16 is electrically isolated from the shaft of motor 15 through insulator 17. Attached to the face of conductive disc 16 is a program selector disc 20.

Attached to the tuning shaft of the conventional television receiver is a wafer switch generally indicated at 50. The wafer switch 50 comprises a 12 position disc 51 which is mounted stationary within the television receiver. Shaft 52 passes through the center of the disc 51 and is isolated therefrom. Attached to, but electrically insulated from, shaft 52 is selector pointer 53. Also attached to selector shaft 42 is conventional channel selector knob 54. As selector knob 54 is moved to rotate shaft 52, selector pointer 53 is rotated to selectively contact preselected positions on disc 51 as indicated in FIG. 1. A commutator 55 electrically contacting pointer 53 remains in electrical contact with the pointer 53 as shaft 52 is rotated. Commutator 55 is electrically connected to the relay $R_s$ through lead 18. The other side of relay $R_s$ is connected to electrical power source $E_v$ through lead 19.

Power source $E_v$ is also connected with conductive disc 16 through supply lead 21 and commutator 22 which contacts conductive disc 16.

As can be seen from FIG. 2, the program selector disc 20 comprises a generally circular disc of insulating material which is divided into radial portions corresponding with units of broadcasting time. In FIG. 2 the disc 20 is divided into 24 units to coincide with 24 hours of broadcasting time in a single day. The disc is also divided into five concentric units to coincide with five available broadcast bands or channels. In the embodiment shown the channels are designated as 4, 5, 8 11 and 13. Appropriately positioned on the disc 20 are perforations selected within each concentric band to coincide with the time and channel which is to be available for viewing.

When program selector disc 20 is affixed to the surface of the rotating conductive disc 16 each of the holes exposes a conductive portion of the surface of the disc 16.

Connected to one side of the power source $E_v$ is bus bar 23 to which are attached five control lines 24, 25, 26, 27 and 28. Connected in series with each control line is an indicator lamp 4, 5, 8, 11 and 13 and a resistor $R_1$, $R_2$, $R_3$, $R_4$ and $R_5$. Each of the parallel control lines is also connected with a spring-loaded commutator point 29, 30, 31, 32 and 33, respectively, which contacts rotating conductive disc 16 through holes in the disc 20.

It will be understood that the values of particular components, such as the resistors, will depend on the characteristics of other components of the circuit employed. Since the only purpose of indicating lamps 4, 5, 8, 11 and 13 are to indicate the availability of unscreened channels, various conventional indicating lamps may be used.

From the foregoing it will be apparent that program selector disc 20 provides an insulating means which opens a circuit and prevents power flowing through any of the five parallel control lines described. However, when a hole in disc 20 comes in registry with a commutator point allowing either of commutator points 29, 30, 31, 32 or 33 to contact conductive disc 16, a circuit is completed allowing current to flow through that branch of the circuit. For example when discs 16 and 20 are rotated so that a hole in disc 20 is aligned with commutator point 29, commutator point 29 comes in electrical contact with disc 16 thus forming a closed circuit traversing the path from power source $E_v$ through bus bar 23 to control line 24, through indicator lamp 4, resistor $R_1$, commutator point 29, conductive disc 16, commutator 22 and supply line 21. When this circuit is closed, indicator lamp 4 is energized indicating that channel 4 may be viewed. Each of the remaining four control lines operate in similar manner to indicate when any of the channels are available for viewing. Note, however, that the above operation only indicates that a channel is available for viewing and does not turn on or turn off the power to receiver 10. Note also that each control line of the indicator circuitry is entirely independent from the others and that any one, all, or none of the indicator lamps may be on at any one time without affecting the others.

Each of contactor points 29—32 are also electrically connected to their respective positions on switch disc 51 by leads 34—38, respectively.

Operation of the circuit will be understood from the following exemplary description. Clock motor 15 drives disc 16 to complete one revolution in a 24 hour period. Perforations are formed in a disc 20 to coincide with the desirable viewing times in each of the five channels for each time period. For example, if a viewer desires to be able to view channel 5 during the period from 12:00 noon to 1:00 P.M., a hole 40 is formed in the insulating disc 20. Likewise a hole 41 may be formed in disc 20 to permit alternate viewing of channel 11. When disc 20 is positioned on disc 16 and rotated therewith, contactor points 29 and 32 will both engage the conductive disc 16 at 12:00 noon and remain in electrical contact therewith until 1:00 P.M. During this time indicator lamps 5 and 11 will glow indicating that the viewer may select either channel 5 or channel 11 for viewing. The remaining indicator lamps will not glow indicating that no other channel may be viewed during this time period. The operator then may rotate knob 54 to channel 11 or channel 5. For example, if the operator desires to view channel 5, the knob 54 is rotated to select channel 5 on the receiving unit. In this position selector pointer 53 contacts point 5 on switch wafer 51, thus completing the circuit between power source $E_r$, supply lead 21, commutator 22, disc 16, commutator point 30, lead 35, pointer 53, commutator 55, lead 18, relay $R_s$ and lead 19. Since the circuit is completed by the switch pointer 53, relay $R_s$ is activated, thus closing switches 14 and providing power to the television receiver. Similarly switches 14 may be closed by rotating the knob 54 to select channel 11. Note, however, that if any other channel is selected power will not be supplied to relay $R_s$ and switches 14 will remain open.

The effect of rotating knob 54 is to selectively interconnect the relay $R_s$ in parallel with any one of the control lines 24—28. If current is flowing through the control line, current will also flow through the relay $R_s$, thus activating the receiver. Note, however, that when electrical contact between disc 16 and commutator pointer 30 is interrupted by disc 20 at the end of the selected viewing period, current ceases to flow between the conductive disc 16 and commutator 20, thus interrupting the circuit controlling relay $R_s$. Since relay $R_s$ is normally open, switches 14 are automatically opened and power to the television receiver is terminated.

For convenience an override switch may be provided as illustrated in FIG. 1. Commutator 55 may be electrically connected to switch 39 through lead 60. When switch 39 is closed a circuit is completed from lead 29 through lamp 61, resistor $R_6$, switch 39, lead 60, commutator 55 and leads 18 and 19, thus energizing relay $R_s$. Accordingly, when switch 39 is closed, all channels are available for viewing regardless of the position of the discs 16 and 20 and regardless of the indications of lamps 4, 5, 8, 11 and 13. This convenient override circuit may be provided so that adult operators may override preselected programming without removing disc 20.

The above described embodiment has been described with reference to a circular disc 20 divided into 24 one-hour intervals. It will be readily understood that the disc may be caused to rotate in different time periods such 12 hour or 7 day periods, and perforations in the disc formed appropriately to provide any desired viewing times. It will be understood, however, that in a 7 day disc the openings will be quite small. Therefore if it is desired to program for longer periods, the drum and tape mechanism of FIG. 3 may be substituted for the pair of discs illustrated in FIGS. 2 and 3.

In the alternative embodiment a conductive drum 70 may be substituted for disc 16. Drum 70 rides on a rotating shaft 71 which is driven by an appropriate clock drive means (not illustrated). Drum 70 may have protruding spikes 72 for drawing the tape 73 thereover. The tape may be any suitable strip of nonconducting material, such as paper, and appropriately lined to provide a number of parallel tracks equivalent to the number of available viewing channels. In FIG. 3 the tape 73 is illustrated having five tracks numbered 4, 5, 8, 11 and 13 which correspond with the same channels discussed with reference to FIG. 1. Holes may be formed in the tape 73 to coincide with the desired available viewing time. As the tape is drawn over the drum, the holes pass in registry with contacting points 74, 75, 76, 77 and 78. Thus it will be understood that the drum apparatus described in reference to FIG. 3 may be substituted for the disc apparatus of FIG. 1 to accomplish essentially the same functions. However, the drum and tape apparatus provides the additional advantage of providing a program selector tape which may be prepared for long time periods, for example seven days in advance. Furthermore the length of the tape may be such that holes can be formed to coincide with 15 or 30 minute intervals and yet allow large enough contact area to provide fairly accurate registry of the contacting points on the drum.

It should be noted that each of the components of the apparatus described are relatively simple and inexpensive, thus the device may be constructed quite inexpensively and could be incorporated as an integral part of television receivers as manufactured. Also the device could be fabricated separately and provided as an auxiliary unit to be connected to existing receivers.

The program selector disc and mechanism associated therewith along with the override switch should preferably be located inside a locked enclosure (not shown) so that parents may select the desirable programs in advance and lock the enclosure so that the preselected programming could not be varied by persons not having access to the enclosure. Thus the system could be used as a tamper-proof preselection programming device for either children or adults.

It is also anticipated that either disc 20 or tape 73 could be formed of conventional heavy paper and distributed in bulk. For example, the tapes or discs can be supplied as inserts in daily or weekly periodicals, or may be provided as an advertising service. Various other means for distribution are readily available.

While the invention has been described with particular reference to specific embodiments thereof, it will be apparent to those skilled in the art that the invention is not limited to the particular electrical components described. For example, it will be understood that other means for interrupting the indicating and control circuitry, such as light responsive devices, may be substituted for the mechanical commutators described. Furthermore, any number of viewing channels may be controlled with various multiples of the indicating circuitry shown.

It is to be understood that although the invention has been described with particular reference to specific embodiments thereof, the form of the invention shown and described in detail is to be taken as the preferred embodiment of same, and that various changes and modifications may be resorted to without departing from the spirit and scope of the invention as defined by the appended claims.

I claim:

1. In a television receiver for receiving plural channels of broadcast television signals and converting said signals to visual representation, apparatus for selectively prohibiting conversion of one or more of said preselected broadcast signal channels for predetermined time periods, the apparatus comprising:

a. control means operative to selectively prohibit the conversion of one or more television signal channels by said receiver;

b. activating means for selectively operating said control means, said activating means further consisting of a supply line electrically connected with a source of electrical energy and a plurality of control lines, first selector switching means selectively operative to effect an electrical connection between said supply line and selected ones of said control lines, thereby to effect a closed circuit through said selected control lines, a second selector switching means selectively operable to electrically interconnect said control means with any of said control lines such that said control means is energized only when interconnected with a control line which is in electrical connection with said supply line; and c. drive means controlling the selective electrical connection of said first selector switching means as a function of time.

2. Apparatus as set forth in claim 1 wherein each of said control lines includes parallel-connected indicating means which indicate when the control line is electrically connected with said supply line.

3. Apparatus as set forth in claim 1 wherein said first selector switching means comprises:

a. a rotatable conductive disc electrically coupled with said supply line;

b. a plurality of commutators, each of said commutators electrically connected to one of said control lines and operative to contact said conductive disc; and c. nonconductive screening means operative to interpose said conductive disc and selected commutators at preselected intervals, thereby to interrupt electrical contact between said conductive disc and selected commutators at preselected time intervals.

4. Apparatus as set forth in claim 3 wherein said nonconductive screening means is a paper disc having apertures therein for permitting said commutators to contact said conductive disc through said apertures.

5. Apparatus as set forth in claim 1 wherein said first selector switching means comprises:

a. a rotatable conductive drum electrically coupled with said supply line;

b. a plurality of commutators, each of said commutators electrically connected to one of said control lines and operative to contact said conductive drum; and c. nonconductive screening means operative to interpose said conductive drum and selected commutators at preselected intervals, thereby to interrupt electrical contact between said conductive drum and selected commutators at preselected time intervals.

6. Apparatus as set forth in claim 5 wherein said nonconductive screening means is a strip of paper having a plurality of apertures therein for permitting said commutators to contact said conductive drum through said apertures when said apertures are in registry with said commutator and said conductive drum.

7. Apparatus as set forth in claim 1 and further including an override switch operative to directly couple said control means with said supply line.